(12) United States Patent
Almassy

(10) Patent No.: US 7,177,651 B1
(45) Date of Patent: Feb. 13, 2007

(54) SYSTEM AND METHOD FOR THE EXCHANGE OF LOCATION INFORMATION IN A TELEPHONE NETWORK

(75) Inventor: Nikolaus P. W. Almassy, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1048 days.

(21) Appl. No.: 09/668,502

(22) Filed: Sep. 22, 2000

(51) Int. Cl.
*H04Q 7/20* (2006.01)
(52) U.S. Cl. .................. 455/456; 455/68; 455/457; 455/461; 455/435; 343/760; 340/994; 701/208
(58) Field of Classification Search ............ 455/68, 455/457, 461, 435, 446, 566, 456; 343/760; 340/994, 995, 991, 988, 905; 701/208, 213
See application file for complete search history.

(56) References Cited

U.S. PATENT DOCUMENTS

| | | | |
|---|---|---|---|
| 5,389,934 A | 2/1995 | Kass | 342/357.07 |
| 5,519,403 A * | 5/1996 | Bickley et al. | 342/352 |
| 5,548,822 A * | 8/1996 | Yogo | 455/68 |
| 5,625,668 A | 4/1997 | Loomis et al. | 485/456.5 |
| 5,917,434 A * | 6/1999 | Murphy | 340/991 |
| 5,918,180 A | 6/1999 | Dimino | 455/456.3 |
| 5,952,959 A | 9/1999 | Norris | 342/357.08 |
| 6,087,965 A * | 7/2000 | Murphy | 340/991 |
| 6,091,957 A | 7/2000 | Larkins et al. | 455/456.2 |
| 6,246,376 B1 | 6/2001 | Bork et al. | |
| 6,317,605 B1 * | 11/2001 | Sakuma | 455/457 |
| 6,360,102 B1 * | 3/2002 | Havinis et al. | 455/457 |
| 6,466,788 B1 * | 10/2002 | Carlsson | 455/435 |
| 6,515,595 B1 * | 2/2003 | Obradovich et al. | 340/905 |

FOREIGN PATENT DOCUMENTS

| | | |
|---|---|---|
| GB | 2 322 248 | 8/1998 |
| WO | WO 01/63315 | 8/2001 |

* cited by examiner

*Primary Examiner*—Jean Gelin
*Assistant Examiner*—Pierre-Louis Desir
(74) *Attorney, Agent, or Firm*—Ronald O. Neerings; Wade James Brady, III; Frederick J. Telecky, Jr.

(57) ABSTRACT

A wireless communications system is presented where a mobile station is able to automatically determine its proximity to a second mobile station or landline telephone. Once the proximity determination command has been given, no further actions are required by the users of either telephone. A GPS receiver connected to the first mobile station is able to provide that mobile with its position and direction. The first mobile station makes a request to the other telephone for its position, through SMS messaging for example. A GPS receiver connected to the second mobile station is able to provide the second mobile station with data to enable the position request. Trust determinations can be enabled so that position data is sent to a restricted list of requesting telephone numbers. Likewise, the second mobile station can request position data from the first mobile station. When position information is requested from a landline telephone, the request can be fulfilled by the landline telephone service provider. A method for automatically exchanging position information is also provided.

34 Claims, 3 Drawing Sheets

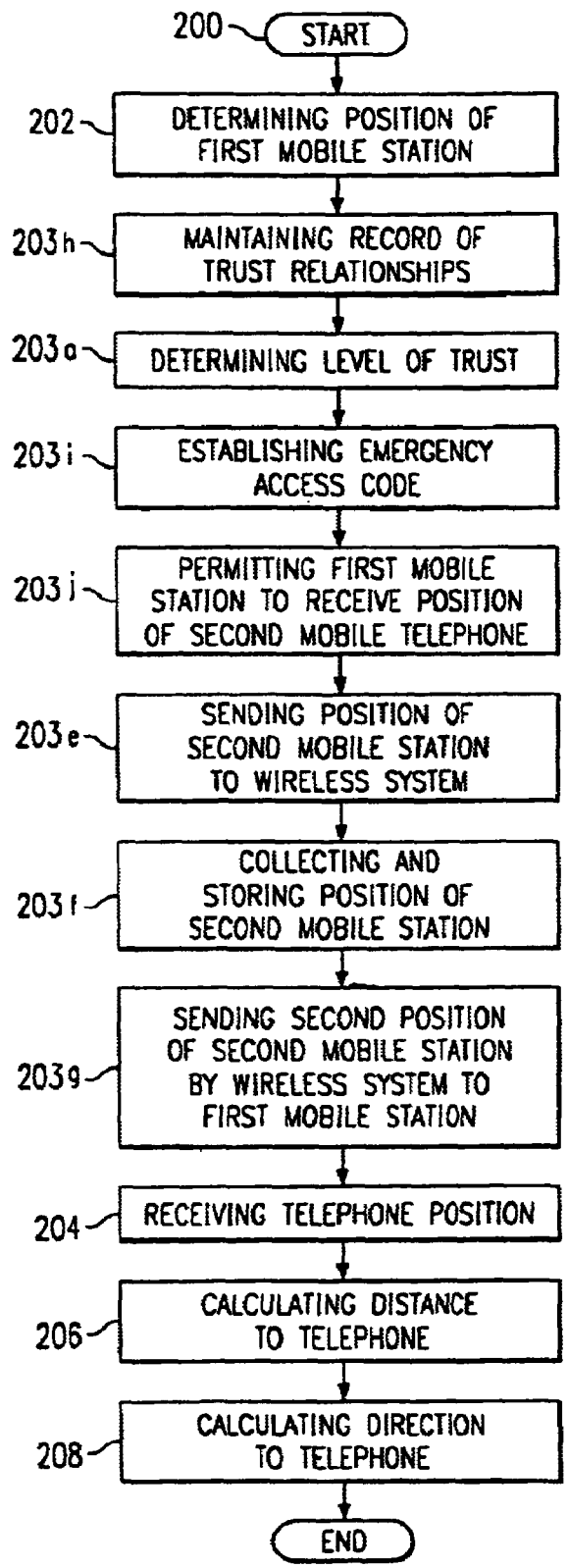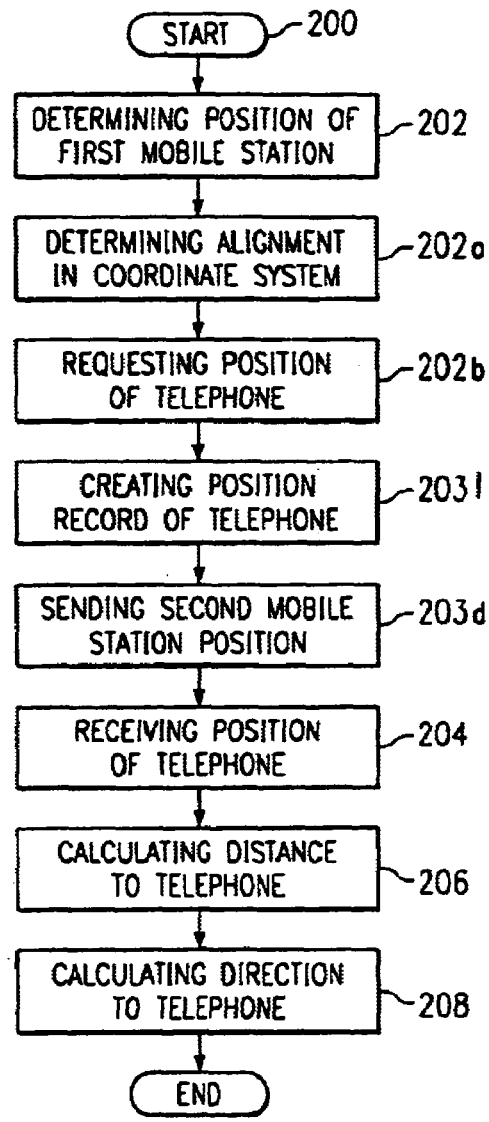

SYSTEM AND METHOD FOR THE EXCHANGE OF LOCATION INFORMATION IN A TELEPHONE NETWORK

BACKGROUND OF THE INVENTION

1. Field of the Invention

This invention relates generally to the field of wireless communications and, more particularly, to a system and method for wireless communications system mobile station to determine distance and direction with respect to another telephone.

2. Description of the Related Art

In most Global Positioning System (GPS) devices, position can be determined with little user involvement. Likewise, from a change in position (at least two locations), absolute direction can be determined. Mobile stations, or mobile telephones have been adapted to interface with a GPS module, such that the distance and direction to targets with known coordinates can be calculated. Alternately, an interfacing GPS receiver allows the mobile station to report its position to another entity, so that the entity can determine its distance and direction from that mobile station.

In some situations it would be desirable to determine the position of a second phone as a target location for the mobile station. It would be possible to create software and a calculating device that would permit the mobile station to enter a second phone's location as a target location, and then track its location with respect to the target location. However, the second telephone position data it can only be processed through user intervention. That is, the user of the second "target" telephone must call the mobile station (or the mobile station must call the second telephone) to communicate its location to the requesting mobile station. Then, the mobile station must enter this location into a calculating device that can calculate distance and relative direction to the target location. A small (handheld) display could be connected to the calculating device to indicate the results. Alternately, a mobile station could be equipped with sufficient processing power, memory, and display to calculate and present the distance calculations.

It would be advantageous if a system could be devised to automatically permit a mobile station to track its position with respect to a second telephone.

It would be advantageous if a mobile station could automatically track its position with respect to a second telephone without a voice connection in a traffic channel to communicate the position information.

It would be advantageous if a mobile station could calculate its proximity to a landline telephone with a fixed location, so as locate stores, restaurants, commercial establishments, and residences.

SUMMARY OF THE INVENTION

According, a method is provided which permits telephones with position determination and caller identification capabilities to exchange location information. The mobile station initiating the exchange uses the information to calculate distance and, if an absolute direction has been established, the relative direction to the other telephone. This invention allows mobile, fixed wireless (wireless local loop), and landline phones to exchange location information without immediate user involvement, while guaranteeing the privacy of both parties.

Specifically, the method comprises: a first mobile station determining its position, typically through the use of an associated GPS receiver; the first mobile station receiving the position of a telephone; and, the first mobile station calculating the distance to the telephone. When the telephone is a second mobile station, it position is determined with the use of an associated GPS receiver. When the telephone is a landline telephone, its position can be stored in memory with either the telephone itself, with the service provider, or in the memory of the first mobile station. In some aspects of the invention, the first mobile station determines its alignment in a coordinate system, so that the direction to the telephone can also be calculated.

The method further comprises: the telephone determining a trust level that it has in the first mobile station. Then, the first mobile station receives the position of the telephone in response to the level of trust determined at the telephone. Alternately, the trust level determination is made by the service provider when the telephone is a landline telephone, or a wireless communications system when the telephone is a second mobile station. In some aspects of the invention, a manual step is inserted in the process. A request is made to the telephone user to authorize the transmission of position information to the first mobile station.

In some aspects of the invention, the method further comprises: establishing a short message service (SMS) identity corresponding to an SMS message to transmit and receive position requests and the transfer of position data. Alternately, the position information can be received through a general message, or even a traffic channel audio message.

In some aspects of the invention, the method further comprises: the first mobile station sending its position to the telephone. As with the sending of the telephone position information, a level of trust determination can condition the first mobile station response.

In a wireless communications system, a mobile station apparatus capable of determining its distance from another telephone is also provided. The system comprises a first mobile station having an input for receiving data to determine its own position and an port to request the position of a telephone. A telephone automatically sends its position to the first mobile station in response to the request. The first mobile station determines the distance to the telephone in response to receiving the telephone position. Details of the system are similar to those summarized above for the present invention method.

BRIEF DESCRIPTION OF THE DRAWING

FIG. 4 illustrates the method of FIG. 3, where aspects of the position transmission and trust determination functions are accomplished at the communications system level.

FIG. 6 is a flowchart related to FIG. 3, specifically illustrating the landline telephone aspect of the invention.

DETAILED DESCRIPTION OF THE PREFERRED EMBODIMENTS

Figure 1:
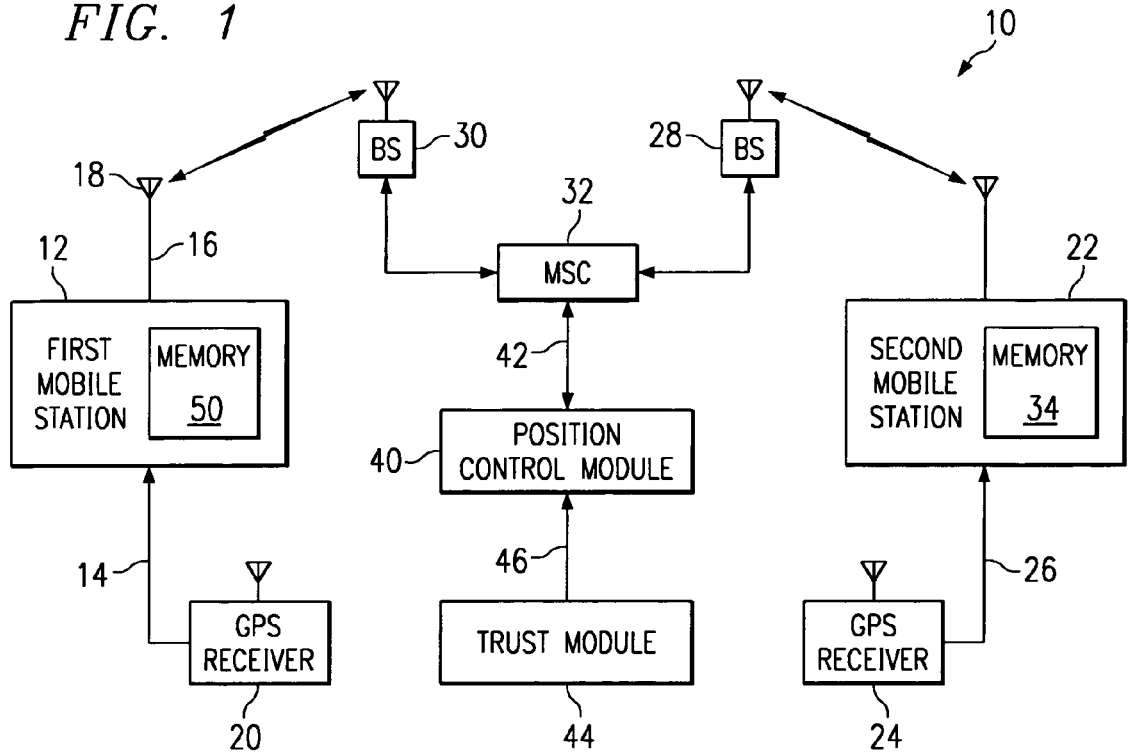
FIG. 1 is a schematic block diagram of a wireless communications system that permits a mobile station to determine its distance from another telephone.

FIG. 1 is a schematic block diagram of a wireless communications system that permits a mobile station to determine its distance from another telephone. The system 10 comprises at least a first mobile station 12 having an input on line 14 for receiving data to determine its own position. A port on line 16, connected to antenna 18, is used to request the position of a telephone. A first global positioning satellite (GPS) receiver 20 is connected to the first mobile station to supply the first mobile station position. Alternately, a base station communicating with the first mobile station 12 supplies position data. In some aspects of the invention, the position of mobile station 12 is determined by the well-known time of arrival (TOA) method by timing the communications between the mobile station and several base stations. Also, a position determination entity (PDE), the use of sectorized antennas, and TOA can be used, or combined to calculate position. The invention is enabled regardless of how the first mobile station 12 receives its position data. For simplicity, it will be assumed in the discussion below that the first mobile station 12 is receiving GPS position data.

The telephone can either be a second mobile station or a landline telephone. FIG. 1 will be used to represent the telephone as a second mobile station 22, while the landline aspect of the telephone is presented in FIG. 2, and discussed below. Regardless of the telephone configuration, the telephone has a position, which is automatically sent to the first mobile station 12 in response to the request for position. The first mobile station 12 determines the distance to the telephone in response to receiving the telephone position. The second GPS receiver 24 is connected to the second mobile station 22 on line 26 to supply the second mobile station position. As is well known, the communications between the first mobile station 12 and the second mobile station 22 is enabled through base stations 28 and 30, as well as a mobile switching center 32. Once again, the second mobile station 22 can receive its position data from a communicating base station or a position determination entity. The invention is enabled regardless of how the second mobile station 22 obtains its position.

A first mobile station user interface (not shown), such as a keyboard, voice recognition module, or similar software module, initiates the determination of the distance to the requested "target" telephone, which can be selected by its phone number or a similar identifier. A second mobile station software application stored in memory, and an associated microprocessor (not shown), act to combine a directory of authorized users with GPS data to determine if its present, or last known location for transmission to the first mobile station 12.

When the first mobile station knows its own position, and the location information of the target telephone is received, a simple algorithm can approximate the distance between the two phones:

$$D = \sqrt{(x_2 - x_1)^2 + (y_2 - y_1)^2}$$

where short distances and a flat surface is assumed. Similar algorithms can incorporate the earth's curvature and the absolute heights of the positions.

If the first mobile station 12 has previously established an absolute direction (e.g., North), the relative direction to the telephone can be computed and displayed as well. If the GPS receiver is able to supply multiple positions, a direction of movement as well as position is know. Alternately, the user can manually enter direction information, use an interfacing compass, or the mobile station can be enabled to assume that the mobile station antenna 18 is pointing North (for example), when the mobile station is unable to determine direction from the GPS data.

Typically, the second mobile station 22 does not send its position to the first mobile station unless the first mobile station is known or trusted. In one aspect of the invention, the second mobile station 22 includes a memory 34 including a record of trust relationships, where a party, the first mobile station 12 for example, is recognized by a caller ID function that is incorporated into the telephone. The second mobile station 22 sends it position in response to accessing the memory 34 to determine the level of trust with the first mobile station. Thus, the position information is sent by the second mobile station 22 automatically, if the first mobile station is trusted. As an added security feature a request can be addressed to the user, to authorize the sending of position data for certain numbers, or a certain class of numbers. As pass phrase or code can be used for the authorization. A software application enables the second mobile station 22 user to access the trust record in memory 34 to edit, add, or delete numbers in the record.

In an alternate aspect of the invention, the position transfer and trust determination functions are preformed at the systems level. A position control module 40 collects and stores the position of the second mobile unit and automatically sends the position of the second mobile station 22 to the first mobile station 12 in response to requests from the first mobile station 12. For simplicity, the position control module is shown connected to the MSC 32 on line 42, however, there are many other means of interfacing such a module to a wireless communications system.

A trust relationship storage module 44 is connected to the position control module 40 on line 46. The trust relationship storage module 44 is accessed by the position control module 40 to determine the level of trust that the second mobile station has in the first mobile station, before the second mobile station position is sent. This aspect of the invention would require the second mobile station user to access or submit a list of trusted telephone numbers to the entity maintaining the modules 40 and 44.

As above, a manual step can be added-so that the second mobile station 22 must authorize the sending of position data. The position control module 40 sends an authorization request to the second mobile station 22, before the second mobile station position information is sent to the first mobile station. If the second mobile station 22 authorizes the request, the position control module transmits the position data.

In a preferred aspect of the invention, the first mobile station receives a short message service (SMS) message. To optimally enable this feature a special SMS identity must be established to notify the communicating parties that that transmitted data represents position data is included in the SMS message. Alternately, a convention SMS message could be used with overhead expended to identify and organize the position data. As another alternate, the first mobile station 12 receives a general message, or any data network subscriber protocol such as WAP or HTTP, to convey the position of the telephone. Further, the first mobile station could receive an audio voice signal to convey the position of the telephone.

In another aspect of the invention, the first mobile station 12 sends its position to the second mobile station 22, upon a request from the second mobile station 22. Upon receiving the position data, the second mobile station 22 calculates to distance to the first mobile station 12. In some aspects of the invention, the first mobile station 12 includes a memory 50 of trust relationships, similar to the second mobile station memory 34 explained above. The first mobile station 12 sends its position in response to accessing the memory 50 to determine the second mobile station level of trust. Alternately, the position data and trust relationships are stored, and the position data sent to the second mobile station 22 through the use of the position control module 40 and trust relationship storage module 44, as described above.

Figure 2:
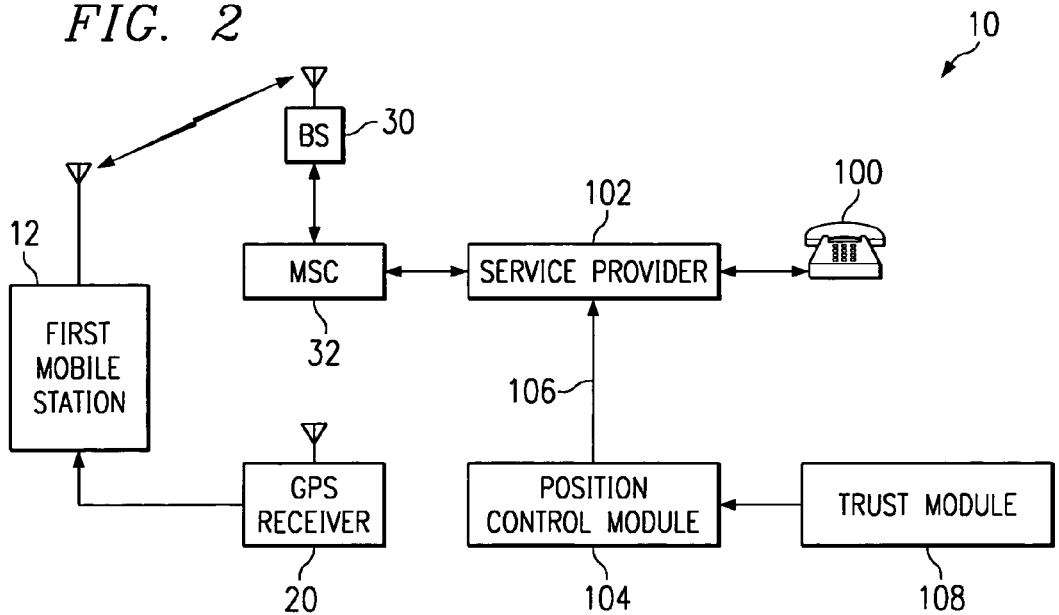
FIG. 2 is a schematic block diagram of a wireless communications system that permits a mobile station to determine its distance from a landline telephone.

FIG. 2 is a schematic block diagram of a wireless communications system that permits a mobile station to determine its distance from a landline telephone 100. The first mobile station communicates with the landline telephone 100 through a local exchange carrier, or service provider 102 which is connected to the MSC 32. A position control module 104 is connected on line 106 to collect and store the position of the landline telephone 100. As with the second mobile station explained above, the position data is automatically sent to the first mobile station 12 in response to requests from the first mobile station.

A trust relationship storage module 108 is connected to the position control module 104 and accessed by the position control module 104 to determine the level of trust that the landline telephone 100 has in the first mobile station 12, before its position is sent. As above, a manual authorization step can be inserted in the process so that the landline telephone 100 must authorize a request from the service provider 102 before the position is sent to the first mobile station 12.

In one preferred aspect of the invention, the position control module 104 is accessed through dialing a dedicated telephone number provided by the service provider 102. Then, the first mobile station 12 (or any other telephone) can request the position of the landline telephone 100 directly from the service provider 102 by dialing the dedicated telephone number to access the position control module 104.

Figure 3:
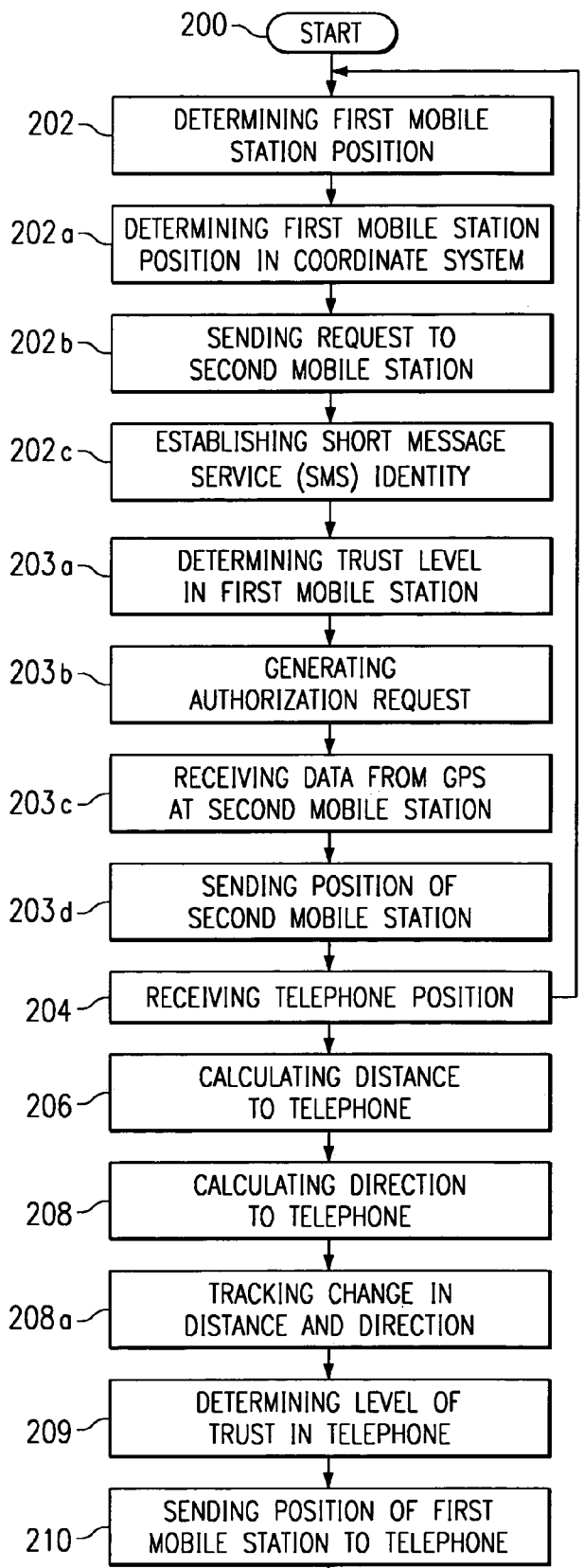
FIG. 3 is a flowchart illustrating a method for a mobile station in a wireless communications system to determine proximity to a telephone.

FIG. 3 is a flowchart illustrating a method for a mobile station in a wireless communications system to determine proximity to a telephone. Additional aspects of the invention described above in the explanation of FIGS. 1 and 2 can be more fully appreciated in the description of the present invention methodology. As understood by those skilled in the art, the methodology can be enabled through the use of software applications and associated microprocessors and memory in the communicating entities. Although the method is described by a series of sequential steps for clarity, no order should be inferred from the process unless explicitly stated.

The method begins at Step 200. In Step 202 a first mobile station determining its position. In Step 204 the first mobile station receives the position of a telephone. Then, in Step 206 the first mobile station calculates the distance to the telephone. In a further step, Step 202a, the first mobile station determines its alignment in a coordinate system. That is, the mobile station determines direction from at least two GPS position updates, a manual compass reading, a manual user input, an assumed direction (i.e., the antenna always points North), or using base station supplied information. Then, Step 208 calculates the direction to the telephone.

In some aspects of the invention a further step is included. In Step 203a the telephone determines a trust level that it has in the first mobile station. Then, receiving the position of the telephone in Step 204 includes receiving the position in response to the level of trust determined by the telephone.

Optionally, in Step 203b the telephone generates a request, addressed to the telephone user, to authorize the sending of the telephone position. Then, receiving the position of the telephone in Step 204 includes receiving the position in response to the request being authorized.

As explained in the description of FIGS. 1 and 2, the first mobile station is connected to a global positioning satellite (GPS) receiver, so that determining the position of the first mobile station in Step 202 includes the first mobile station receiving data from the GPS receiver. As mentioned above, the method is not dependent on any particular means of determining location, but the GPS means will be assumed for simplicity.

In some aspects of the invention, the telephone is a second mobile station, connected to a GPS receiver, and the method comprises a further step. In Step 203c the second mobile station receives data from the connected GPS receiver. In Step 203d the second mobile station sends its position in response to the data received from the connected GPS receiver.

In Step 202b the first mobile station sends a request for the position of the second mobile station. Then, the second mobile station sending its position in Step 203c includes the second mobile station sending its position in response to the first mobile station position request. In some aspects, the second mobile station sending its position in Step 203c includes the second mobile station automatically sending its position in response to the request.

FIG. 4 illustrates the method of FIG. 3, where aspects of the position transmission and trust determination functions are accomplished at the communications system level. In some aspects of the invention, the second mobile station sends its position to the wireless communications system in Step 203e. In Step 203f the wireless communications system collects and stores the position of the second mobile station. Then, the first mobile station sending a request for the position of the second mobile station in Step 202b includes sending the position request to the wireless communications system. In Step 203g the wireless communications system sends the second mobile station position to the first mobile station in response to the position request.

In some aspects of the invention, a further step, Step 203h maintains a record of trust relationships with the wireless communication system. Then, determining the level of trust that the second mobile station has in the first mobile station in Step 203a includes the wireless communications system determining the trust level in response to accessing the record of trust relationships.

In some aspects of the invention a step, Step 203i establishes an emergency access code to the record of trust relationships. Step 203j permits the first mobile station to receive the position of the second mobile telephone in response to presenting the emergency access code to the wireless system.

Figure 5:
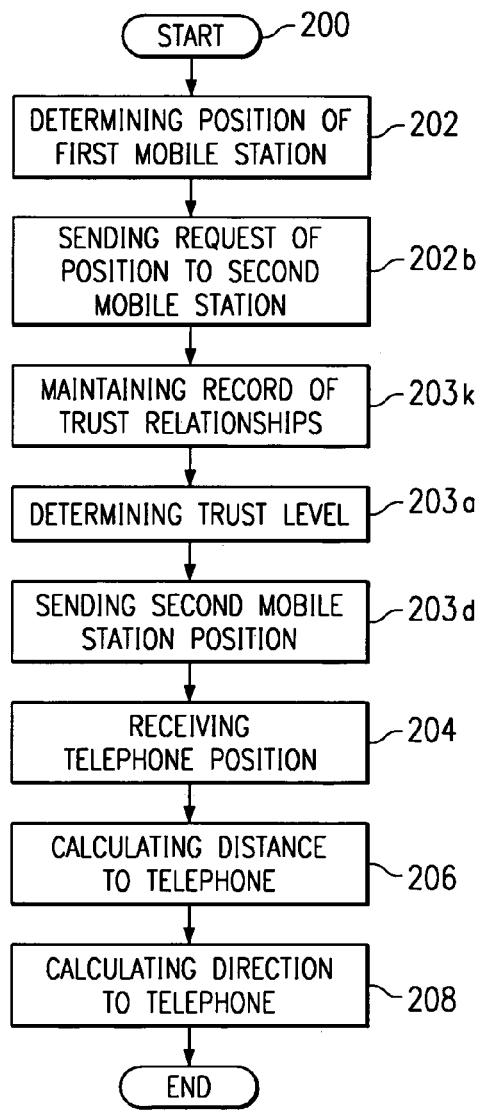
FIG. 5 is the flowchart of FIG. 3, specifically describing the performance of the position transmission and trust analysis functions being performed in the second mobile station.

FIG. 5 is the flowchart of FIG. 3, specifically describing the performance of the position transmission and trust analysis functions being performed in the second mobile station. Then, Step 202b includes the first mobile station sending its request for the position of the second mobile station to the second mobile station. In Step 203d the second mobile station sends the second mobile station position to the first mobile station in response to the request.

In some aspects of the invention the second mobile station includes a memory. Then, Step 203k maintains a record of trust relationships in the memory of the second mobile station. The determining of the level of trust that the second mobile station has in the first mobile station in Step 203a includes the second mobile station determining the trust level in response to accessing the record of trust relationships.

Returning the FIG. 3, in some aspects of the invention, a further step, Step 202c establishes a short message service (SMS) identity corresponding to an SMS message for the transmission and reception of position requests and the transfer of position data. Then, receiving the position of the telephone in Step 204 includes receiving the position by SMS messaging. Alternately, receiving the position of the telephone in Step 204 includes receiving the position by a general message, by a traffic channel audio signal, or any subscriber protocol that can be applied to a data network, such as WAP and HTTP.

In some aspects of the invention, the first mobile station sends its position to the telephone in Step 210. Step 209 determines the level of trust that the first mobile station has in the telephone. Then, the first mobile station sends its position to the telephone in Step 210 in response to the determined level of trust.

FIG. 6 is a flowchart related to FIG. 3, specifically illustrating the landline telephone aspect of the invention. That is, the telephone is a landline telephone associated with a service provider. Step 2031 creates a position record of the telephone with the service provider. Then, the first mobile station receiving of the position of the telephone in Step 204 includes the first mobile station receiving the position of the telephone from the service provider.

In one aspect of the invention, Step 202b includes the first mobile station requesting the position of the telephone, from the telephone. Then, in Step 203 the telephone requests that the service provider send its position to the first mobile station.

Alternately, In Step 202b the service provider creates a dedicated number to request position information. Then, the first mobile receiving of the position of the telephone in Step 204 includes the first mobile station dialing the dedicated number to receive the telephone position.

In some aspects of the invention the telephone is a landline telephone associated with a service provider and the first mobile phone has a memory. Then, Step 2031 creates a position record of the telephone in the first mobile station memory, and the first mobile station receiving of the position of the phone in Step 204 includes the first mobile station accessing its memory to receive the position of the telephone.

Returning to FIG. 3, in some aspects of the invention Steps 202 and 204 are repeated a plurality of times. That is, the first mobile station receives a plurality of telephone position over a period of time, as represented by the flow path connecting Step 204 to Step 202. Then, in Step 208a the first mobile station tracks the change in distance and direction to the telephone over the period of time.

In Step 210, following the receiving the telephone position in Step 204, the position of the telephone, or the relative position between the first mobile station and the telephone, is communicated to the user with a presentation selected from the group including audio voice signals and graphic displays.

Specific examples of a system and method for automatically providing position data to communicating telephones has been provided. Although not specifically detailed, the present invention would also be applicable to telephones with known locations in fixed wireless network. Also, the emergency code trust override feature could be enabled in communications with the second mobile station. Likewise, a trust override feature could be enabled with the first mobile station, or in accessing the position of a landline telephone. Also, a landline telephone could be enabled by a service provider to inquire into and present the position of a mobile station. Other variations and embodiments of the invention will occur to those skilled in the art.

I claim:

1. In a wireless communications system, a method for a mobile station to determine proximity to a telephone, the method comprising:

a first mobile station determining its position;

the first mobile station requesting the position of a telephone;

the telephone accessing a record of trust relationships regarding the communications system to determine a trust level for the first mobile station;

the first mobile station receiving the position of the telephone if the first mobile station meets a selected level of trust; and the first mobile station calculating the distance to the telephone.

2. The method of claim 1 further comprising:

the first mobile station determining its alignment in a coordinate system; and calculating the direction to the telephone.

3. The method of claim 1 further comprising:

generating a request, to authorize the sending of the telephone position; and wherein receiving the position of the telephone includes receiving the position in response to the request being authorized.

4. The method of claim 1 in which the first mobile station is connected to a global positioning satellite (GPS) receiver; and wherein determining the position of the first mobile station includes the first mobile station receiving data from the GPS receiver.

5. The method of claim 4 in which the telephone is a second mobile station, connected to a GPS receiver, and the method further comprising:

the second mobile station receiving data from the connected GPS receiver; and the second mobile station sending its position in response to the data received from the connected GPS receiver.

6. The method of claim 5 further comprising:

the first mobile station sending a request for the position of the second mobile station; and wherein the second mobile station sending of its position includes the second mobile station sending its position in response to the first mobile station position request.

7. The method of claim 6 wherein the second mobile station sending of its position includes the second mobile station automatically sending its position in response to the request.

8. The method of claim 6 further comprising:

the second mobile station sending its position to the wireless communications system;

the wireless communications system collecting and storing the position of the second mobile station; and wherein the first mobile station sending a request for the position of the second mobile station includes sending the position request to the wireless communications system; and the method further comprising:

the wireless communications system sending the second mobile station position to the first mobile station, in response to the position request.

9. In a wireless communications system, a method for a first mobile station to determine proximity to a second mobile station, the method comprising:
the first mobile station connected to a global positioning satellite (GPS) receiver, the first mobile station receiving data from the GPS receiver for determining its position;
the first mobile station requesting the position of the second mobile station, the second mobile station connected to a global positioning satellite (GPS) receiver and receiving data from the GPS receiver for determining its position;
the second mobile station determining a trust level that it has in the first mobile station;
the second mobile station automatically sending the position of the second mobile station to the wireless communications system in response to a determination of an acceptable trust level;
the wireless communications system collecting and storing the position of the second mobile station; and
the first mobile station calculating the distance to the second mobile station.

10. The method of claim 9 further comprising:
establishing an emergency access code to the record of trust relationships; and
permitting the first mobile station to receive the position of the second mobile station in response to presenting the emergency access code to the wireless system.

11. The method of claim 6 wherein the first mobile station sends its request for the position of the second mobile station to the second mobile station; and
wherein the second mobile station sends the second mobile station position to the first mobile station, in response to the request.

12. In a wireless communications system, a method for a first mobile station to determine proximity to a second mobile station, the method comprising:
the first mobile station connected to a global positioning satellite (GPS) receiver, the first mobile station receiving data from the GPS receiver for determining its positions;
the first mobile station requesting the position of the second mobile station, the second mobile station connected to a global positioning satellite (GPS) receiver and receiving data from the GPS receiver for determining its position;
the second mobile station determining a trust level that it has in the first mobile station, the second mobile station including a memory and maintaining a record of trust relationships in the memory of the second mobile station, wherein determining the level of trust that the second mobile station has in the first mobile station includes the second mobile station determining the trust level in response to accessing the record of trust relationships;
the second mobile station sending the position of the second mobile station to the first mobile station in response to a determination of an acceptable trust level;
the wireless communications system collecting and storing the position of the second mobile station;
the wireless communications system sending the position of the second mobile station to the first mobile station; and the first mobile station calculating the distance to the second mobile station.

13. The method of claim 1 further comprising:
establishing a short message service (SMS) identity corresponding an SMS message to transmit and receive position requests and the transfer of position data; and
wherein receiving the position of the telephone includes receiving the position by SMS messaging.

14. The method of claim 1 wherein receiving the position of the telephone includes receiving the position by a general message and data network subscriber protocols including WAP and HTTP.

15. The method of claim 1 wherein the first mobile station receiving of the telephone position includes the first mobile station receiving the telephone position via an audio signal.

16. The method of claim 1 further comprising:
the first mobile station sending its position to the telephone.

17. The method of claim 16 further comprising:
determining the level of trust that the first mobile station has in the telephone; and
wherein the first mobile station sends its position to the telephone in response to the determined level of trust.

18. The method of claim 1 in which the telephone is a landline telephone associated with a service provider; and
the method further comprising:
creating a position record of the telephone with the service provider; and
wherein the first mobile station receiving of the position of the phone includes the first mobile station receiving the position from the service provider.

19. The method of claim 18 further comprising:
the first mobile station requesting the position of the telephone, from the telephone; and
the telephone requesting the service provider to send its position to the first mobile station.

20. The method of claim 18 further comprising:
the service provider creating a dedicated number to request position information; and
wherein the first mobile receiving of the position of the telephone includes the first mobile station dialing the dedicated number to receive the telephone position.

21. The method of claim 1 in which the telephone is a landline telephone associated with a service provider and the first mobile phone has a memory; and
the method further comprising:
creating a position record of the telephone in the first mobile station memory; and
wherein the first mobile station receiving of the position of the phone includes the first mobile station accessing its memory to receive the position.

22. The method of claim 2 further including:
the first mobile station receiving a plurality of telephone position over a period of time; and
the first mobile station tracking the change in distance and direction to the telephone over the period of time.

23. The method of claim 1 further comprising:
following the receiving the telephone position, communicating the position with presentations selected from the group including audio signals and graphic displays.

24. In a wireless communications second mobile station, a method of sending the position of a second mobile station to a first mobile station, the method comprising:
a second mobile station receiving a request for position from a first mobile station;
determining a trust level that the second mobile station has in the first mobile station;

the second mobile station automatically sending its position to the first mobile station, wherein sending the second mobile station position to the first mobile station includes sending the position in response to the determined trust level;

maintaining a record of trust relationships in the memory of the second mobile station; and wherein determining the trust level that the second mobile station has in the first mobile station includes the second mobile station determining the trust level by accessing the record of trust relationships in memory.

25. The method of claim 24 further comprising:

the first mobile station determining its own position;

the second mobile station receiving the position of the first mobile station; and the second mobile station calculating the distance to the first mobile station.

26. The method of claim 25 further comprising:

the second mobile station determining its alignment in a coordinate system; and calculating the direction to the first mobile station.

27. The method of claim 25 further comprising:

prior to receiving the position of the first mobile station, requesting the position of the first mobile station.

28. The method of claim 24 further comprising:

establishing a short message service (SMS) identity corresponding to an SMS message for transmitting and receiving the request for position and sending of position data; and wherein sending the position includes sending the position by SMS messages.

29. The method of claim 24 wherein sending the position of the second mobile station includes sending the position by a general message and data network subscriber protocols including WAP and HTTP.

30. The method of claim 24 wherein sending the position of the telephone includes sending the position by an audio voice signal.

31. In a wireless communications system, a mobile station capable of determining its distance from another mobile station, the system comprising:

a first mobile station having an input for receiving data to determine its own position and a port to request the position of a second mobile station which is automatically sent to the first mobile station in response to the request for position;

the second mobile station including a memory of trust relationships, and wherein the second mobile station sends its position in response to accessing the memory to determine the level of trust with the first mobile station; and wherein the first mobile station determines the distance to the second mobile station in response to receiving the position of the second mobile station.

32. The system of claim 31 wherein the second mobile station creates a request, addressed to the second mobile station user, authoring the sending of its position.

33. The system of claim 31 further comprising:

a position control module connected to the wireless system to collect and store the position of the second mobile unit, and automatically send the second mobile station position to the first mobile station in response to requests from the first mobile station.

34. In a wireless communications system, a mobile station capable of determining its distance from another mobile station, the system comprising:

a first mobile station having an input for receiving data to determine its own position and a port to request the position of a second mobile station and including a memory of trust relationships and wherein the first mobile station sends its position in response to accessing the memory to determine the second mobile station level of trust;

the second mobile station having a position, which is automatically sent to the wireless communication system in response to the request for position; and wherein the second mobile station calculates the distance to the first mobile station in response to receiving the first mobile station position.

* * * * *